March 1, 1938. W. H. CONANT 2,109,468
DICTATING MACHINE AND SYSTEM
Filed May 22, 1935 6 Sheets-Sheet 1

March 1, 1938. W. H. CONANT 2,109,468
DICTATING MACHINE AND SYSTEM
Filed May 22, 1935 6 Sheets-Sheet 2

INVENTOR
WILLIAM H. CONANT
BY Sager & Malcolm
ATTORNEYS

Patented Mar. 1, 1938

2,109,468

UNITED STATES PATENT OFFICE 2,109,468

DICTATING MACHINE AND SYSTEM

William H. Conant, Scarsdale, N. Y.

Application May 22, 1935, Serial No. 22,687

19 Claims. (Cl. 274—17)

This invention relates to a remote control system for dictating and transcribing letters, reports and the like which are ordinarily dictated to shorthand stenographers or to machines located within arms-reach of the dictator and operated by air or lung pressure.

The principal object of the invention is to provide an improved system for recording dictation, conferences, speeches, court testimony and the like at a distance from the point of origin, with all recording and reproducing mechanism under complete control of the dictator as in a mechanical dictating machine but without the inconveniences of such machines.

Another object is to provide an automatic change-over system for changing from one recording machine to another when the first record has become full.

In the preferred form of the invention my system comprises two principal sections, namely: a microphone which is mounted on the dictator's desk together with various control switches and an ear phone for listening to back dictation, and the recording machine and associated mechanisms which are located elsewhere in the same or another room accessible to the secretary whose duty it is to transcribe the dictation.

To operate the system the dictator simply pushes a hand or foot switch, thereby placing the microphone in circuit and starting a motor which rotates the sound record disc or cylinder. Additional switches are provided to indicate the length of letters on a tape or chart and to indicate corrections or other explanatory notations for the information of the transcriber. When the dictator lifts the ear phone he automatically converts the recording machine into a reproducer which reproduces part or all of the preceding dictation as desired.

In the case of two or more machines, an automatic change-over switch is provided which is actuated when the carriage nears the end of its travel to start the second machine for continuous recording and to stop the first machine. A signal may be energized to indicate the completion of a record to the dictator or to the operator.

These and numerous other features and advantages of the invention will be described in connection with the accompanying drawings, in which.

Figure 10:
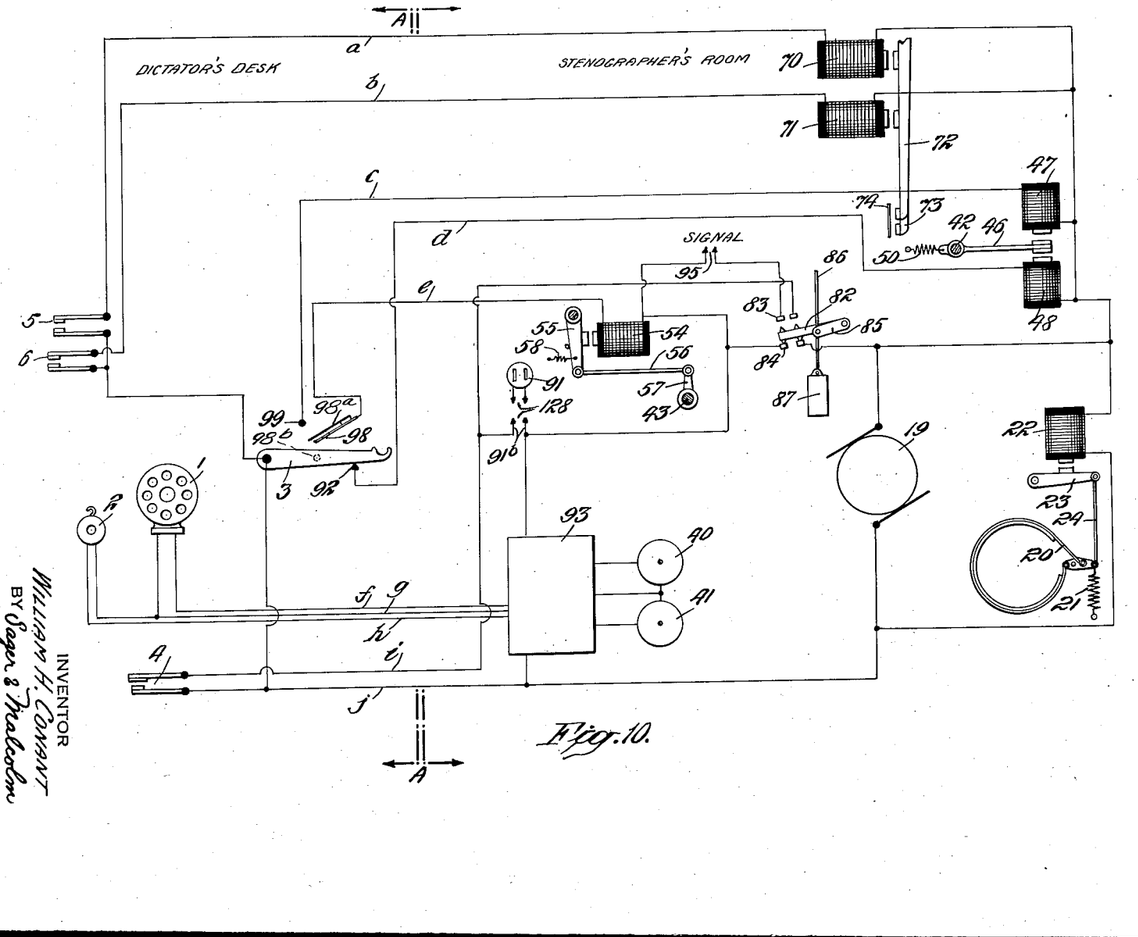
Fig. 10 is a circuit diagram illustrating the system as applied to a single recording machine.

By referring first to Fig. 10, it will be seen that dot and dash lines A—A are used to separate the mechanisms mounted on or adjacent the dictator's desk from the recording machine located in the stenographer's room.

The mechanisms on or adjacent the dictator's desk are the microphone 1, receiver or ear phone 2, hook 3 for the ear phone, and hand or foot switches 4, 5, and 6 the functions of which will be described later. The recording and associated mechanisms of Figs. 1 to 9, are all located in the stenographer's room indicated to the right of the dot and dash lines A—A in Fig. 10. I shall first describe Figs. 1 to 9, after which I shall describe the operation of the system as a whole with particular reference to Fig. 10.

Figure 1:
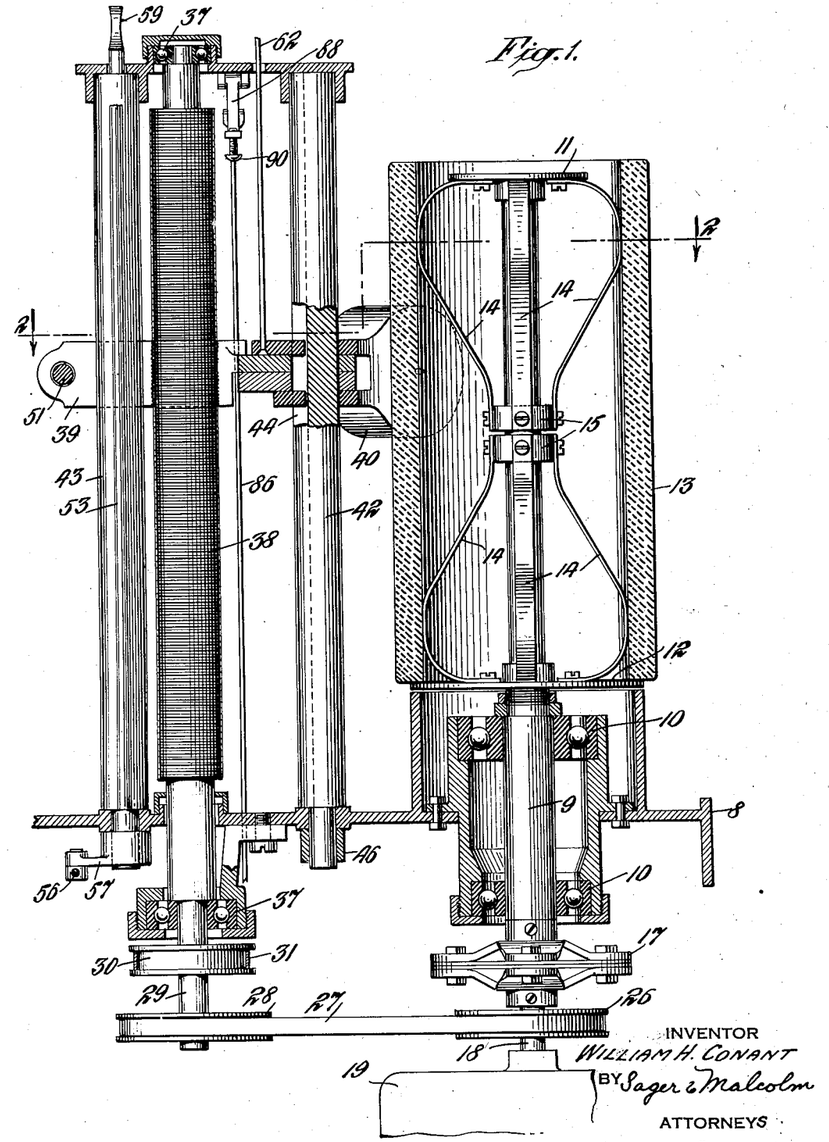
Fig. 1 is a vertical section on line 1—1 of Fig. 5, showing a dictating machine embodying my invention.
Figure 2:
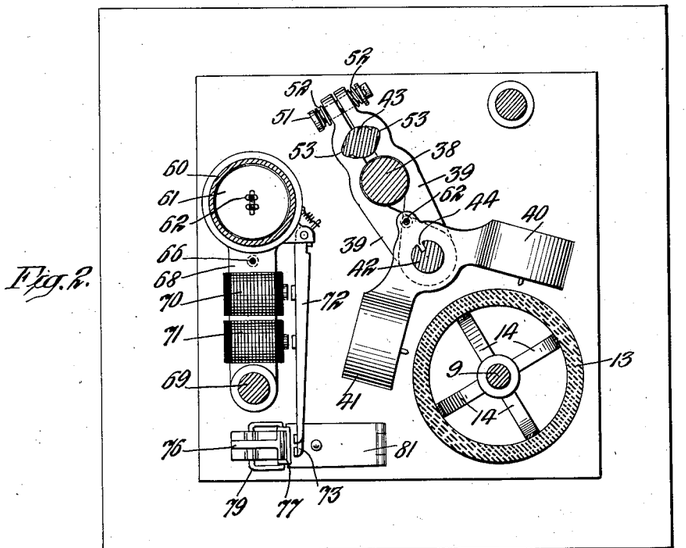
Fig. 2 is a horizontal section taken on line 2—2 of Fig. 1.
Figures 5, 6:
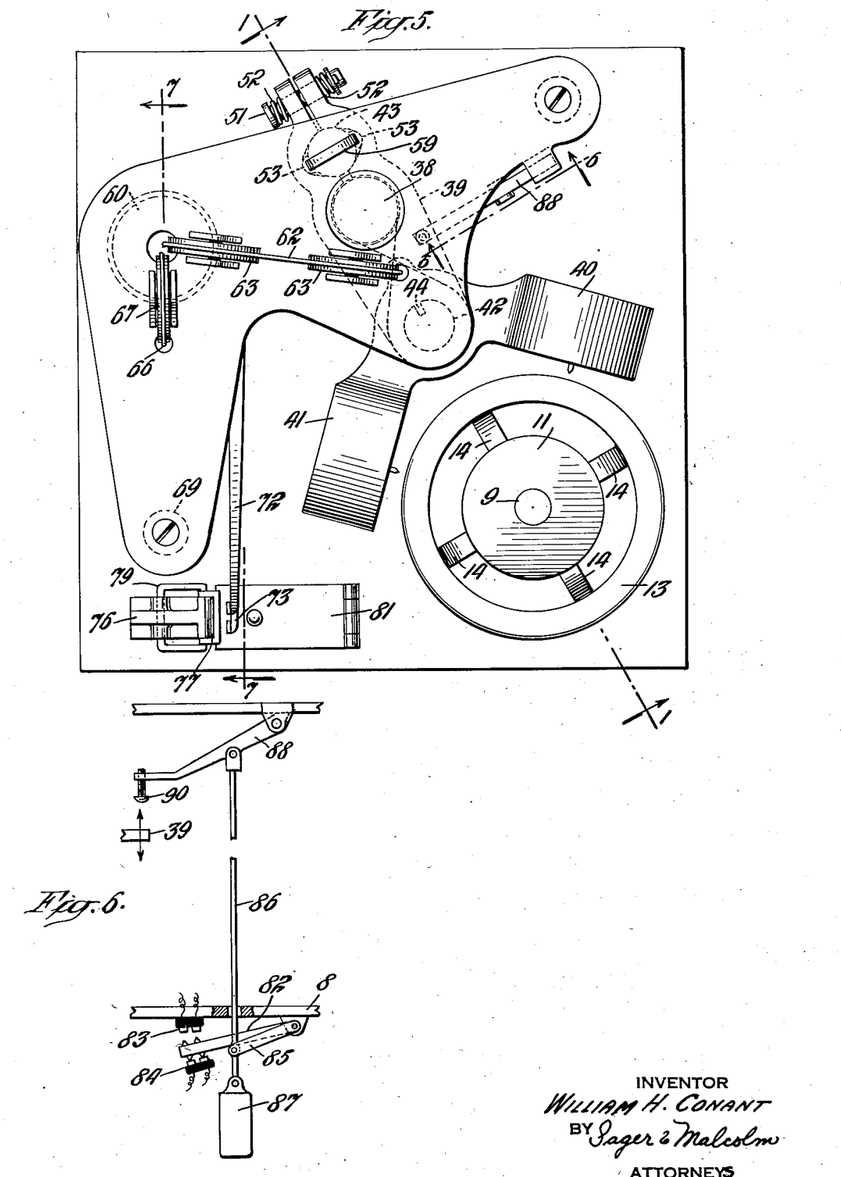
Fig. 5 is a top plan view of Fig. 1.
Fig. 6 is a vertical section taken on line 6—6 of Fig. 5.

The dictating machine shown here for purposes of illustration comprises a frame 8 supporting vertical shaft 9 which is rotatably mounted in ball bearings 10 as shown in Fig. 1. Shaft 9 carries upper and lower horizontal discs 11 and 12 the latter of which is large enough in diameter to support a conventional wax record cylinder 13. The cylinder 13 is held in place on disc 12 by springs 14 which have their outer ends secured to discs 11 and 12, and their inner ends secured to collars 15 which are mounted loosely so as to slide on shaft 9, the springs being bowed outwardly to frictionally engage the inner wall of cylinder 13 as shown in Figs. 1, 2, and 5. The springs 14 center the record properly and make it run true and at the same time grip the record tightly enough to provide the required driving friction and to prevent slippage. They furthermore allow for expansion and contraction due to temperature changes which feature has not been adequately provided for in previous machines of this type.

Figures 3, 4:
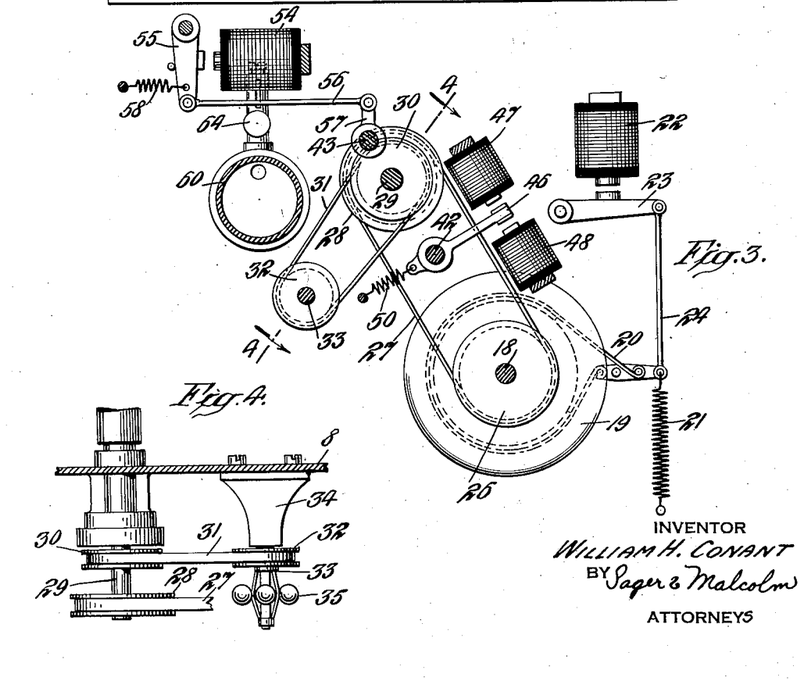
Fig. 3 is a diagrammatic view of the mechanism for actuating the recorder and reproducer of Figs. 1 and 2.
Fig. 4 is a detail section taken on line 4—4 of Fig. 3.

Shaft 9 is connected by coupling 17 to shaft 18 of motor 19 which accordingly drives cylinder 13. Motor 19 is provided with a suitable brake 20 actuated by spring 21 as shown in Fig. 3. Brake 20 is released by magnet 22 having its armature 23 pivoted to brake rod 24 as shown in Fig. 3. The energizing circuit of magnet 22 will be described later. Motor shaft 18 carries pulley 26 which is connected by belt 27 to pulley 28 on vertical screw shaft 29 as shown in Figs. 1 and 3. Shaft 29 also carries pulley 30 connected by belt 31 to pulley 32 on stub shaft 33 which is journaled in bearing 34 on frame 8 and carries any suitable type of speed governor such as ball governor 35 shown in Fig. 4.

Vertical screw shaft 29 is journaled in bearings 37 at the top and bottom of frame 8 and is threaded throughout the major portion of its length as indicated at 38. The purpose of this screw shaft is to actuate the vertically movable split carriage 39 on which are pivotally mounted the electromagnetically operated recorder 40 and reproducer 41. Carriage 39 is guided in its movement by vertical shafts 42 and 43 which are arranged on opposite sides of screw 38 as shown in Figs. 1, 2 and 5. Shaft 42 passes through the recorder-reproducer unit 40—41 and has a vertical slot 44 in which said unit is guided by means of a suitable feather key. At its lower end shaft 42 is secured to armature 46 of magnets 47 and 48 whose purpose it is to rotate shaft 42 sufficiently to contact either recorder 40 or reproducer 41 with the wax cylinder 13, depending upon the direction in which said shaft is rotated. When magnet 47 attracts armature 46 it rotates shaft 42 in a counter-clockwise direction as viewed in Figs. 2, 3 and 5, thereby moving the needle of reproducer 41 into engagement with cylinder 13. When magnet 48 attracts armature 46, however, it rotates shaft 42 in a clockwise direction as viewed in Figs. 2, 3 and 5, thereby moving the needle of recorder 40 into engagement with cylinder 13. When magnets 47 and 48 are both deenergized, spring 50 holds armature 46 in a central or neutral position in which recorder 40 and reproducer 41 are both out of contact with cylinder 13 as indicated in Figs. 2, 3 and 5.

Carriage 39 is split scissors-like and is clamped about screw 38 and shaft 43 by bolt 51 which passes loosely through both sides of the carriage, and by coil springs 52 which surround bolt 51 and force the sides of the carriage together as shown in Figs. 2 and 5. Shaft 43 has opposite longitudinal ridges 53 which act as cams serving to spread the sides of carriage 39 apart against the pressure of springs 52 whenever shaft 43 is rotated slightly from the normal position shown in Figs. 2 and 5. When the carriage is spread in this manner it will disengage the threads of screw 38, making it possible for the carriage to drop back toward its starting position for the purpose of reviewing previous dictation or for resetting the machine as hereinafter described. This rotary canting movement of shaft 43 is controlled either by manual means such as a handle 59 or by magnet 54 having its armature 55 connected by lever 56 to a crank 57 which is secured to the lower end of shaft 43 as shown in Figs. 1 and 3. When magnet 54 is deenergized, spring 58 returns armature 55 and associated mechanisms to normal position with carriage 39 locked on screw 38 as shown in Figs. 2 and 5. The handle 59 may be actuated to reset the carriage as at the completion of a record cylinder. The magnet 54 is adapted to be energized in a manner to be described for dropping the carriage a slight amount as for reviewing previous dictation.

Figures 7, 8, 9:
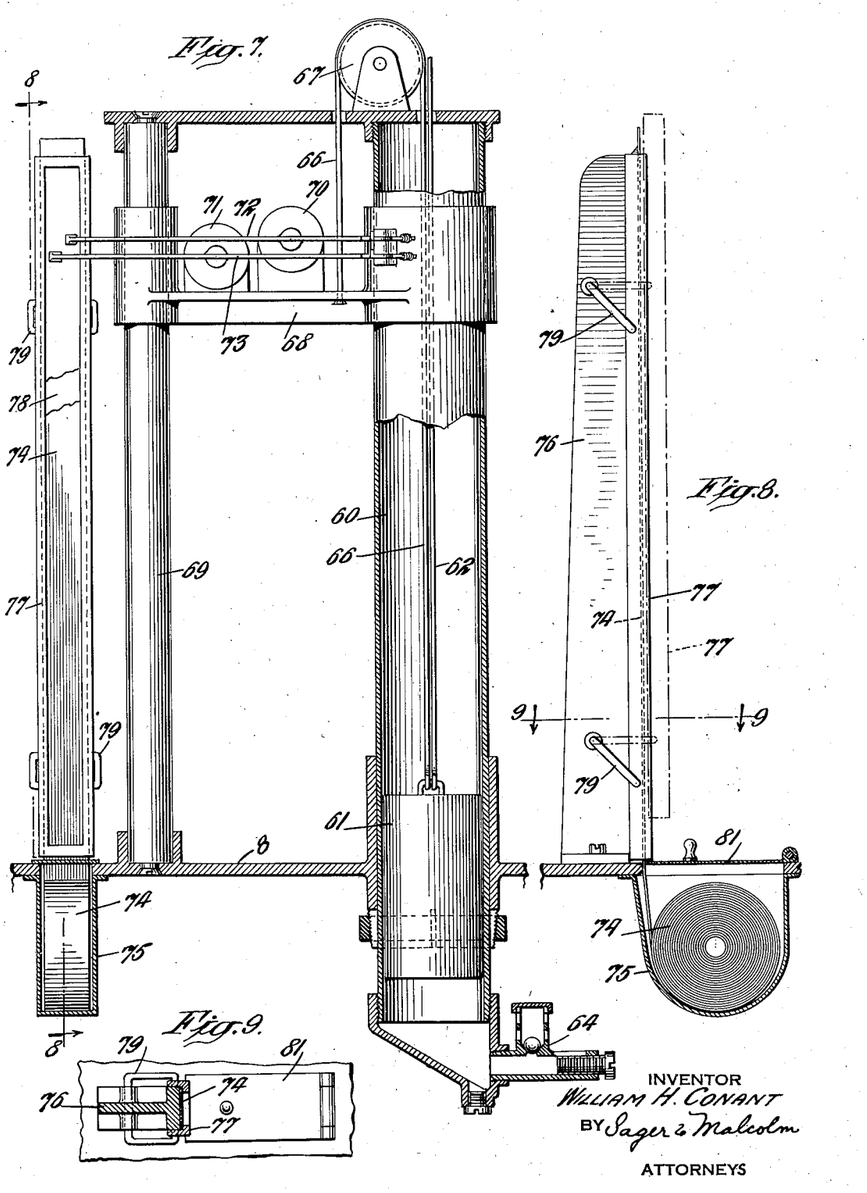
Fig. 7 is a vertical section on line 7—7 of Fig. 5 and shows the tape mechanism for recording the end of a letter as well as corrections in dictation.
Fig. 8 is a vertical section taken on line 8—8 of Fig. 7.
Fig. 9 is a horizontal section taken on line 9—9 of Fig. 8.

Figs. 2, 3 and 7 show a vertical tube 60 containing a close-fitting plunger or counterweight 61 which serves to lessen the load on driving screw 38 and check the rate of travel of carriage 39 when the carriage is released from the screw as previously described. Counterweight 61 is fastened to cable 62 which passes over pulleys 63 and is secured to carriage 39 as shown in Figs. 1, 5 and 7. The movement of counterweight 61, and hence the movement of carriage 39 when released from screw 38, is retarded by the column of air in tube 60 which is controlled by a valve 64 of any suitable type arranged in the base of the tube as shown in Fig. 7. At the start of the dictation, carriage 39 is at the bottom of wax cylinder 13 and counterweight 61 is adjacent the top of tube 60. Motor 19 rotates cylinder 13 and screw 38, gradually raising carriage 39 together with recorder 40 and reproducer 41, and at the same time lowering counterweight 61. When carriage 39 is disengaged from screw 38, by actuating cam shaft 43 as previously described, it tends to drop back to its starting position, carrying the recorder-reproducer unit along with it. The cushioning effect of the air column on counterweight 61 prevents the carriage from descending too rapidly and makes it possible for the operator to drop the carriage back toward its starting position in successive small stages instead of in a single quick jump.

A second cable 66 is also fastened to counterweight 61 as shown in Fig. 7. This cable passes over pulley 67 and is secured to a vertically movable platform 68 which is slidably mounted on a tube 60 and standard 69 as shown in Figs. 2, 5 and 7, from which it will be seen that platform 68 moves up and down with carriage 39. Platform 68 carries magnets 70 and 71 having armatures 72 and 73, respectively, resembling typewriter keys which are adapted to record signals on a paper strip or tape 74. In the form shown in Figs. 7, 8 and 9, a roll of tape 74 is stored in a well 75 in frame 8 and the tape is drawn upwardly between frame 76 and cover 77 as required. Beneath the tape 74 in frame 76 is a strip of carbon paper 78 which may be renewed from time to time and is placed with its sensitized surface toward tape 74 so as to make a mark on said tape whenever armature key 72 or 73 is actuated by its magnet 70 or 71. Magnet 70 and armature key 72 are for the purpose of indicating corrections in dictation on tape 74 while magnet 71 and armature key 73 are for the purpose of marking the end of a letter on said tape, these magnets being operated by the dictator as hereinafter described. Cover 77 is pivoted to frame 76 by hinges 79 which enable the cover to swing out parallel to frame 76 when opened as indicated in dotted lines in Fig. 8. The secretary, in removing a cylinder 13 for transcription, also raises cover 77 and removes the length of tape 74 in frame 76 to use as a guide in transcribing the dictation, which unrolls another length of tape and clamps same on frame 76 by closing cover 77. The opening of the cover frees tape 74 from the carbon paper and prevents the markings from being blurred when the tape is unreeled. The well 75 has a hinged lid 81 providing access to the well for the purpose of replenishing the tape 74 as indicated in Figs. 7 to 9.

The frame 8 carries a pivoted contact arm 82 adapted to engage upper contacts 83 or lower contacts 84 according to the position of said arm. As shown in Figs. 6 and 10, contact arm 82 is secured to lever 85 which is pivoted to vertical rod 86 carrying weight 87, and the rod 86 is suspended from lever 88 which is pivoted on the top frame of the machine as best shown in Fig. 6. When the parts are in the position shown in Figs. 6 and 10, contact arm 82 engages lower contacts 84 which are in the energizing circuit of motor 19 as hereinafter described. When carriage 39 reaches the end of its upward travel it engages screw 90 on lever 88, thereby raising lever 88, rod 86, lever 85 and contact arm 82 which opens contacts 84 and closes contacts 83. Screw 90 is adjustable in lever 88 to adjust the point at which this operation takes place. The contact arm 82 may be provided with a spring toggle mechanism, not shown, to effect a quick make and break of the contacts 83 and 84. The opening of contacts 84 breaks the energizing circuit of motor 19 and therefore stops the rotation of record 13 and halts the ascent of carriage 39 carrying the recorder-reproducer unit. The closure of contacts 83 completes a circuit to a signal 95 as hereinafter described, thereby indicating to the operator that a record has been completed and that the machine is to be reset with a new record.

In describing the operation of the system it is assumed that the carriage 39 is in its initial starting position at the bottom of cylinder 13. The other mechanisms are in the positions illustrated in Fig. 10 except that ear phone 2 is suspended from hook 3 although it is shown off the hook to avoid confusion in the drawings. In order to start the dictation the dictator simply closes hand or foot switch 4 and talks into microphone 1.

Closure of switch 4 energizes motor 19 and brake magnet 22 over parallel circuits extending from one side of outlet receptacle 91 through switch 4, windings of motor 19 and magnet 22 in parallel, contact arm 82 and contacts 84, to the other side of receptacle 91. Magnet 22 releases brake 20 and allows motor 19 to rotate record 13 as well as screw 38 which actuates carriage 39 carrying recorder 40 and reproducer 41. Closure of switch 4 likewise energizes magnet 48 over a circuit extending from one side of receptacle 91 through switch 4, hook 3 and hook contact 92, winding of magnet 48, contact arm 82 and contacts 84, to the other side of receptacle 91. Magnet 48 attracts its armature, thereby rotating shaft 42 in a clockwise direction as viewed in Figs. 2, 3, 5 and 10, which moves the needle of recorder 40 into engagement with cylinder 13. Closure of switch 4 also energizes the tubes and associated mechanisms of the recording and reproducing circuits represented by the box 93 in Fig. 10.

The dictation may now proceed without interruption until the record 13 is completely filled up, at which time carriage 39 will actuate lever 88 in Fig. 6 thereby shifting contact arm 82 which opens contacts 84 and closes contacts 83 as previously described. The opening of contacts 84 deenergizes motor 19 and magnet 22, whereupon spring 21 applies brake 20 which prevents the motor from coasting. The energizing circuit of magnet 48 is likewise broken at contacts 84, permitting spring 50 to return armature 46 and shaft 42 to the neutral position in which the needles of recorder 40 and reproducer 41 are out of contact with record 13. Closure of contacts 83 energizes signal 95 over a circuit extending from one side of outlet receptacle 91, through contacts 83, signal 95, to the other side of receptacle 91. Signal 95 informs the operator that the record is full, a similar signal preferably being provided in the same circuit to warn the stenographer to remove the filled record 13 and susbtitute a blank record in its place. The operator then removes the full record, inserts a fresh record cylinder and actuates the handle 59 to drop the carriage to its starting position.

In the course of the dictation the dictator will ordinarily desire to register a mark on tape 74 to indicate the point where each letter ends, thereby enabling the secretary to gauge the length of each letter before transcribing it. This he may do simply by pressing switch button 6 which energizes magnet 71 over a circuit extending from one side of receptacle 91, through switch 6, winding of magnet 71, contact arm 82 and contacts 84, to the other side of receptacle 91. Magnet 71 thereupon attracts its armature key 73, making a mark on tape 74 which, of course, will correspond with the vertical position of recorder 40 at that particular moment. To indicate corrections in dictation the dictator presses switch button 5, thereby energizing magnet 70 over a circuit similar to that of magnet 71, magnet 70 thereupon attracting its armature key 72 which makes a mark on tape 74 as previously described. Armature keys 72 and 73 are of different lengths as illustrated so that their respective marks, one indicating corrections and the other indicating the end of a letter, will be confined to their own individual channels on tape 74.

In the course of dictation the dictator may wish to "back track" and listen to some or all of his preceding dictation. To do this the dictator simply lifts the ear phone 2 off hook 3, which operation opens contact 92. A pin 98b then momentarily makes contact with a spring arm 98 and finally breaks contact with the arm 98 as the arm flexes to allow the pin 98b to pass and closes contact 99. The opening of contact 92 deenergizes magnet 48 and thereby returns armature 46 to central or neutral position which disengages recorder 40 from record 13. The closure of contact with the arm 98 energizes magnet 54 over a circuit extending from one side of receptacle 91, through switch 4, hook 3 and arm 98, winding of magnet 54 to the other side of receptacle 91. Magnet 54 thereupon attracts its armature 55, rotating shaft 43 which spreads the sides of carriage 39 and allows the carriage to descend slowly as previously described. The momentary closure of contact with the arm 98, resulting in the momentary energization and prompt deenergization of magnet 54, enables carriage 39 to drop back much or little depending upon the duration of the energization, but repeated manipulation of hook 3 or holding the hook in contact with the arm 98 causes the carriage 39 with its recorder-reproducer unit to drop back any desired distance. Finally, the closure of contact 99 by hook 3 energizes magnet 47 over a circuit extending from one side of receptacle 91, through switch 4 (which remains closed as long as the machine is in use), hook 3 and contact 99, winding of relay 47, contact arm 82 and contacts 84, to the other side of receptacle 91. Magnet 47 now attracts armature 46, thereby moving reproducer 41 into engagement with record 13 and reproducing the dictation in ear phone 2. When the ear phone is replaced on hook 3, contact 92 is closed and recorder 40 is again moved into engagement with record 13 enabling the dictation to proceed. When the hook 3 moves downwardly the pin 98b engages a flexible insulating member 98a which flexes with the arm 98 to permit the pin to pass and prevents the pin 98b from making contact with the arm 98.

If the dictator wishes to interrupt his dictation, and resume it later, he simply opens switch 4 thereby stopping motor 19 and otherwise returning the parts to the normal position shown in Fig. 10. The carriage 39 carrying the recorder-reproducer unit remains in the position where it stopped, ready to continue when dictation is resumed.

Figure 11:
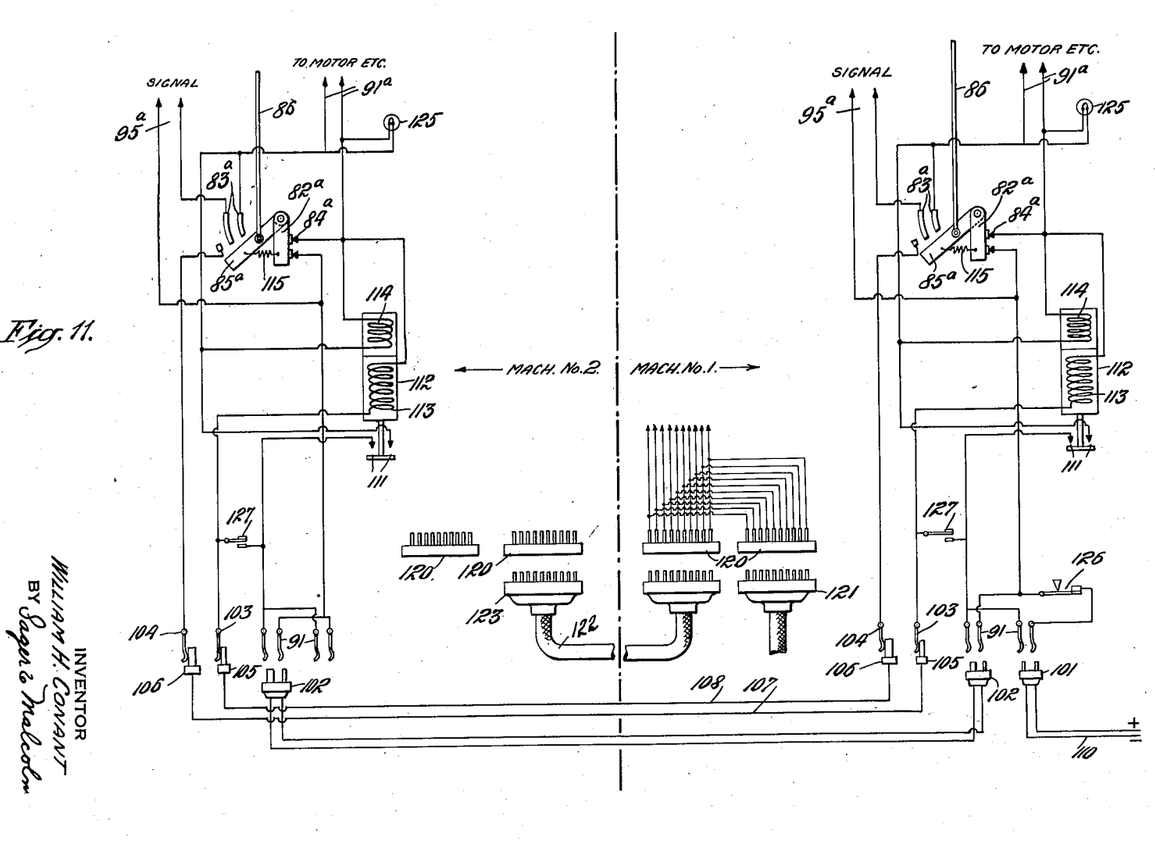
Fig. 11 is a circuit diagram illustrating the system adapted for multiple recording machine operation and showing the power connections therefor.

For recording lengthy dictation, speeches, etc., I prefer to employ a plurality of machines arranged for multiple operation as illustrated in Fig. 11. This figure shows two machines each having a pair of receptacles 91. One of the receptacles 91 of machine #1 is adapted to receive a power plug 101. The other receives a connecting plug 102 which connects to a receptacle 91 of machine #2. Each machine also has receptacles 103 and 104. Such receptacles 103 and 104 of machine #1 are adapted to receive plugs 105 and 106, respectively, which connect by cords 107, 108 to similar receptacles of machine #2. The connections are such that receptacle 103 of machine #1 is connected to receptacle 104 of machine #2 and receptacle 103 of machine #2 is connected to receptacle 104 of machine #1. For multiple operation of more than two machines the receptacle 103 of machine #2 is connected to a receptacle 104 of a third machine the receptacle 103 of which is connected to the receptacle 104 of machine #1. In such case it is understood that a receptacle 91 of the third machine would be connected to the appropriate receptacle 91 of machine #2. Each machine is also provided with a pair of multiple conductor receptacles 120 which are connected in parallel to wires $a$ to $j$ of the respective machines. These wires are indicated as crossing the lines A—A of Fig. 10 which separate the dictator's desk from the stenographer's room. A multiple jack 121, connected to the portions of the wires $a$ to $j$ leading to the dictator's desk may be inserted in one of the receptacles 120 of machine #1. Machine #2 may be connected by a cable 122 connected to multiple jacks 123 one of which may be inserted in a selected receptacle 120 of each machine. Obviously the system may be extended in this way to any number of machines. The above is given as an example only.

In this embodiment the power supply to the motor and other operating devices above described is taken from a line 110 which is connected to the receptacle 91 of machine #1 through a circuit including motor control switch contacts 84a and the contacts 111 of a motor control solenoid 112 having an operating coil 113 and a holding coil 114.

The motor control switch comprises an arm 85a connected to the rod 86, and a lever 82a, said arm 85a and lever 82a being adapted to close contacts 83a and 84a, respectively. The parts 82a, 83a, 84a and 85a are generally similar to the parts 82, 83, 84 and 85 of Fig. 6. This embodiment differs, however, from that of Fig. 6 in the provision of a spring 115 between the arm 85a and the lever 82a, which spring permits contacts 83a to close before contacts 84a are broken. A toggle action may also be provided to effect a snap action if desired.

When the carriage of machine #1 nears the end of its travel and actuates rod 86 to close contacts 83a a circuit is closed to the operating coil 113 of machine #2 through cord 108, coil 113 of machine #2 and contacts 84a of machine #2. This energizes the solenoid 113 of machine #2, closes its contacts 111 and starts the machine operating. Further movement of the carriage of machine #1 actuates the rod 86 to open contacts 84a and stop machine #1, the spring 115 being adapted to operate the lever 82a after a predetermined movement of the arm 85a so as to cause an overlap of a few words on the two records whereby continuity of recording is assured. The first machine may be then manually reset for the next operation.

When the first machine is reset the contacts 83a will be broken, thereby deenergizing the coil 113 of machine #2. Hence a holding coil 114 is provided which is connected in parallel with the line 110 and is energized as long as contacts 84a and 111 of the corresponding machine are closed. When the contacts 84a are broken the coil 114 is deenergized and the motor contacts 111 are allowed to open to stop the machine.

A signal circuit 95a is also connected to the contacts 83a and is adapted to be closed when said contacts are closed. This signal circuit is for the purpose of indicating to the stenographer that a record has been filled and that it is time to replace the record and reset the machine.

It will be noted that plug 106 is made larger than plug 105 so as to assure connection in the proper receptacle. The plug 102 must likewise be polarized to assure maintaining correct polarity in the circuit.

A signal light 125 may be connected to the motor circuit of each machine to indicate when the machine is connected to operate.

A switch 126 may be inserted in the power lead to the machine for the purpose of completely disconnecting all circuits thereto. When this switch is opened the holding coil 114 is deenergized, allowing contacts 111 to open. Reclosing of the switch 126 will accordingly not reenergize the power circuit until the coil 113 is energized. This may be manually accomplished by a momentary contact switch 127 adapted to connect the lead from the coil 113 to the power line.

It is to be understood that the circuits of Fig. 11 may be interposed between the arrows 128 of Fig. 10 when multiple operation is desired, the plug 101 leading to the receptacle 91 and the motor leads 91a of Fig. 11 being connected to leads 91b of Fig. 10. When only a single machine is used the receptacle 91 is connected directly to the leads 91b.

It is to be noted that the mechanism described above provides for dictation to a single machine or for multiple operation such as in recording lengthy speeches, etc. The entire machine is located at a remote point with the exception of the microphone, receiver and control buttons. The operation for dictating or for listening back is practically automatic. To dictate it is only necessary to press the starting switch and dictate into the microphone. When the receiver is lifted off the hook for listening back it automatically drops the carriage and operatively connects the reproducing apparatus.

In multiple operation one machine is automatically started when the record of the preceding machine is filled. The operator then resets the first machine in condition to be restarted when the subsequent record or records are filled. The dictator is not interrupted for changing records.

This is particularly important for recording speeches, court proceedings, conferences, etc. The signal lights provide the necessary visual indications for the dictator and the operator.

A specific embodiment of the invention has been shown for purposes of illustration. It will be evident, however, that various changes and modifications may be made therein without departing from the scope of the invention which is to be limited only by the appended claims when interpreted in view of the prior art.

The invention claimed is:

1. In a dictating machine, a carriage, recording and reproducing means carried thereby, a threaded member to feed said carriage for recording or reproducing purposes, said carriage having a split member normally engaging said feed member, a cam rod along which said split member slides, means to rotate said cam rod to spread said split member to thereby release said carriage from said feed member, and means to automatically cause reverse movement of said carriage when the carriage is thus released from said feed means.

2. In a dictating machine, a carriage, recording and reproducing a threaded member carried thereby, means to feed said carriage for recording or reproducing purposes, said carriage having a split member normally engaging said feed member, a cam rod along which said split member slides, means to rotate said cam rod to spread said split member to thereby release said carriage from said feed member, and gravity actuated means to cause reverse movement of said carriage when the carriage is released from said feed means.

3. In a dictating machine, a carriage, recording and reproducing means carried thereby, a threaded feed member for feeding said carriage along a record, said carriage having a split member normally engaging said feed member, a rod along which said split member slides, means responsive to rotation of said rod to spread said split member to thereby release the carriage from the feed member, and means to cause reverse movement of the carriage when so released.

4. In a dictating machine, a carriage, recording and reproducing means carried thereby, a threaded feed member for feeding said carriage along a record, said carriage having a spreadable split member normally engaging said feed member, a movable cam cooperating with said split member to spread the same to thereby release the carriage from the feed member, remote control means to actuate said cam, and means to cause reverse movement of the carriage when so released.

5. In a dictating machine, a carriage, recording and reproducing means carried thereby, a threaded feed member for feeding said carriage along a record, said carriage having a spreadable split member normally engaging said feed member, a movable cam cooperating with said split member to spread the same to thereby release the carriage from the feed member, a magnet for actuating said cam, and means to cause reverse movement of the carriage when so released.

6. In a dictating machine, a carriage, a reproducer and a recorder carried thereby, means to feed the carriage along a record, a vertically extending, pivoted guide member along which said carriage slides, means interconnecting said recorder and reproducer with said guide member to swing therewith for selectively shifting the same into operative positions with respect to said record, means normally holding said guide member in a central position with said recorder and reproducer both out of contact with said record and means to selectively actuate said guide member to bring either said recorder or said reproducer into operative contact with said record.

7. In a dictating machine, a carriage, a reproducer and a recorder carried thereby, means to feed the carriage along a record, a vertically extending, pivoted guide member along which said carriage slides, means interconnecting said recorder and reproducer with said guide member to swing therewith for selectively shifting the same into operative positions with respect to said record, means normally holding said guide member in a central position with said recorder and reproducer both out of contact with said record, and means comprising a two-position electromagnet to selectively actuate said guide member to bring either said recorder or said reproducer into operative contact with said record.

8. In combination, a microphone and a receiver having a recorder and a reproducer respectively connected thereto, a carriage carrying said recorder and said reproducer, means to feed said carriage past a record, a hanger adapted to be displaced by the weight of said receiver, means controlled by said hanger to render said recorder operative when said receiver is on said hanger and means controlled by said hanger to render said recorder inoperative and said reproducer operative when said receiver is removed from said hanger.

9. In combination, a microphone and a receiver having a recorder and a reproducer respectively connected thereto, a carriage carrying said recorder and said reproducer, means to feed said carriage past a record, a hanger adapted to be displaced by the weight of said receiver, means controlled by said hanger to render said recorder operative when said receiver is on said hanger, means controlled by said hanger to render said recorder inoperative and said reproducer operative when said receiver is removed from said hanger, means actuated by movement of said hanger when said receiver is removed therefrom to interrupt said feed and means to cause a return movement of said carriage when said feed is thus interrupted whereby the last recorded sounds may be heard in the receiver.

10. In a dictating machine, a support for a cylindrical record rotatable about a vertical axis, a recorder, a vertical threaded shaft adapted to feed said recorder upwardly along said record, said recorder having a split member normally engaging said threaded shaft, a cam rod along which said split member slides and adapted when rotated to spread said split member to release the recorder from said feed means, means whereby the weight of said recorder returns said recorder when so released, and a counterweight for retarding said return motion.

11. In a dictating machine, a support for a cylindrical record rotatable about a vertical axis, a recorder, a vertical threaded shaft adapted to feed said recorder upwardly along said record, said recorder having a split member normally engaging said threaded shaft, a cam rod along which said split member slides and adapted when rotated to spread said split member to release the recorder from said feed means, and means whereby the weight of said recorder returns said recorder when so released, and a counterweight operating in an air cylinder, the counterweight constituting a plunger to compress the air in said cylinder and to thereby retard the return movement of said recorder.

12. In a dictating machine, a carriage, a reproducer and a recorder carried thereby, means to feed the carriage along a record, means including a two-position electromagnet to selectively shift said reproducer and recorder into operative position with respect to said record, a receiver, a hanger therefor movable under the weight of said receiver, a contact closed by said hanger when said receiver is removed to energize said electromagnet so as to shift said reproducer into operative position, and a contact closed by said hanger when said receiver is in place to energize said electromagnet so as to shift said recorder into operative position.

13. In a dictating machine, a carriage, a reproducer and a recorder carried thereby, means to feed the carriage along a record, means to release the carriage from said feed means, means including an electric circuit to actuate said release means, means including a two-position electromagnet to selectively shift said reproducer and recorder into operative position with respect to said record, a receiver, a hanger therefor movable under the weight of said receiver, a contact closed by said hanger when said receiver is removed to energize said electromagnet so as to shift said reproducer into operative position, a contact closed by said hanger when said receiver is in place to energize said electromagnet so as to shift said recorder into operative position, a contact closed by said hanger at an intermediate point in its movement to elevated position to complete said circuit to thereby release the carriage from said feed means and means to return the carriage while so released.

14. In a dictating machine, a carriage, a reproducer and a recorder carried thereby, feed means, means to operatively and releasably interconnect the feed means and carriage to feed the carriage along a record, means including a two-position electromagnet to selectively shift said reproducer and recorder into operative position with respect to said record, a receiver, a hanger therefor movable under the weight of said receiver, a contact closed by said hanger when said receiver is removed to energize said electromagnet so as to shift said reproducer into operative position, a contact closed by said hanger when said receiver is in place to energize said electromagnet so as to shift said recorder into operative position, and means actuated by movement of said hanger when the receiver is removed therefrom to release the carriage from said feed means and means to cause return movement of said carriage when so released to position same for listening back.

15. In a dictating machine, a carriage, a reproducer and a recorder carried thereby, feed means, means to operatively and releasably interconnect the feed means and carriage to feed the carriage along a record, means including a two-position electromagnet to selectively shift said reproducer and recorder into operative position with respect to said record, a receiver, a hanger therefor movable under the weight of said receiver, a contact closed by said hanger when said receiver is removed to energize said electromagnet so as to shift said reproducer into operative position, a contact closed by said hanger when said receiver is in place to energize said electromagnet so as to shift said recorder into operative position, release means actuated by movement of said hanger when the receiver is removed therefrom to release the carriage from said feed means, means to cause return movement of said carriage when so released to position same for listening back, and means to prevent such actuation of said release means when the receiver is replaced on said hanger.

16. In a dictating machine system, in combination, a plurality of recording machines operable in sequence, each machine having a recorder movable over a record, a control circuit for each machine including a main relay having a closing coil and a holding coil, means actuated by each recorder when it nears the end of its travel to temporarily energize the main relay closing coil on the next machine for starting the same, means energizing the holding coil of the main relay when said relay closes to hold the relay in closed position, and means actuated by the first machine to thereafter deenergize its own holding coil for stopping the first machine.

17. In a dictating machine system, in combination, a plurality of recording machines operable in sequence, each machine having a recorder movable over a record, a control circuit for each machine including a main relay having a closing coil and a holding coil, means actuated by each recorder when it nears the end of its travel to temporarily energize the main relay closing coil on the next machine for starting the same, means energizing the holding coil of the main relay when said relay closes to hold the relay in closed position, means actuated by the first machine to thereafter deenergize its own holding coil for stopping the first machine, and a signal circuit connected across each holding coil and energized when the corresponding holding coil is energized to indicate the condition of operation of each machine.

18. In a dictating machine, a carriage, a reproducer and recorder carried thereby, means to feed the carriage along a record, a vertically extending, pivoted guide member along which said carriage slides, and means interconnecting said reproducer and recorder with said guide member to swing therewith for selectively shifting the same into operative positions with respect to said record.

19. In a dictating machine system, in combination, a plurality of recording machines operable in sequence, each machine having a recorder movable over a record, a control circuit for each machine including a main relay having a closing coil, each machine having a switch connected to close the control circuit to the closing coil of the next machine, means actuated by the recorder of each machine when it nears the end of its travel to close the switch of said machine so as to start the next machine, additional means actuated by said recorder at the end of its travel to thereafter open the relay of said first machine for stopping the same, and means independent of said closing coil to hold the relay of said next machine closed when said switch is opened by the resetting of said first machine.

WILLIAM H. CONANT.